(12) United States Patent
St-Pierre et al.

(10) Patent No.: US 10,843,743 B2
(45) Date of Patent: Nov. 24, 2020

(54) VEHICLE HAVING A REMOVABLE PANEL ASSEMBLY

(71) Applicant: BOMBARDIER RECREATIONAL PRODUCTS INC., Valcourt (CA)

(72) Inventors: Dany St-Pierre, Sherbrooke (CA); Daniel Nadeau, St-Denis-de-Brompton (CA); Andre Denis, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 128 days.

(21) Appl. No.: 16/316,905

(22) PCT Filed: Jun. 15, 2017

(86) PCT No.: PCT/IB2017/053574
§ 371 (c)(1),
(2) Date: Jan. 10, 2019

(87) PCT Pub. No.: WO2018/025099
PCT Pub. Date: Feb. 8, 2018

(65) Prior Publication Data
US 2019/0300071 A1    Oct. 3, 2019

Related U.S. Application Data

(60) Provisional application No. 62/369,885, filed on Aug. 2, 2016.

(51) Int. Cl.
*B60K 37/00* (2006.01)
*B62D 27/06* (2006.01)
(Continued)

(52) U.S. Cl.
CPC .............. *B62D 27/06* (2013.01); *B60N 2/015* (2013.01); *B62D 21/183* (2013.01);
(Continued)

(58) Field of Classification Search
CPC ........ A41C 3/0057; B65D 2571/00141; B65D 2571/0066; B65D 27/06; Y10S 206/806;
(Continued)

(56) References Cited

U.S. PATENT DOCUMENTS 4,217,970 A *   8/1980   Chika ................... B60G 21/055
                                                    180/298
5,573,300 A    11/1996   Simmons
(Continued)

FOREIGN PATENT DOCUMENTS

CN       104703865 A     6/2015
RU          157516 U1   12/2015

OTHER PUBLICATIONS

International Search Report of PCT/IB2017/053574; Blaine R. Copenheaver; dated Sep. 15, 2017.
(Continued)

*Primary Examiner* — Kiran B Patel
(74) *Attorney, Agent, or Firm* — BCF LLP

(57) ABSTRACT

A vehicle is disclosed, comprising a frame, a driver seat connected to the frame, a plurality of ground engaging members operatively connected to the frame, a motor operatively connected to at least one of the wheels, the motor being disposed rearward of the driver seat, and a panel assembly connected to the frame, the motor being accessible to a user when the panel assembly is removed, the panel assembly including a cargo platform, a left side panel connected to a left side of the cargo platform, and a right side panel connected to a right side of the cargo platform, the panel assembly and a portion of the frame being selectively removable from the vehicle as a unit. In some implementations, the portion of the frame includes a cross-member disposed under the cargo platform, and a left and right leg extending therefrom.

12 Claims, 14 Drawing Sheets

(51) Int. Cl.
*B60N 2/015* (2006.01)
*B62D 21/18* (2006.01)
*B62D 23/00* (2006.01)
*B62D 25/08* (2006.01)
*B62D 25/00* (2006.01)

(52) U.S. Cl.
CPC ........... *B62D 23/005* (2013.01); *B62D 25/00* (2013.01); *B62D 25/082* (2013.01); *B62D 25/087* (2013.01)

(58) Field of Classification Search
CPC .. H04N 13/398; H04N 13/189; H04N 13/324; H04N 13/337; G02B 30/25
See application file for complete search history.

(56) References Cited

U.S. PATENT DOCUMENTS

| | | | | |
|---|---|---|---|---|
| 6,547,027 B1* | 4/2003 | Kalhok | ................... | B62J 1/12 |
| | | | | 180/210 |
| 6,702,058 B2* | 3/2004 | Ishii | ................ | B62K 5/01 |
| | | | | 180/311 |
| 6,823,956 B2* | 11/2004 | Shimizu | .............. | F16H 57/0415 |
| | | | | 180/68.1 |
| 7,258,395 B2* | 8/2007 | Bataille | ................ | B62D 21/183 |
| | | | | 296/203.01 |
| 7,407,031 B2* | 8/2008 | Hayashi | ................... | B62K 5/01 |
| | | | | 180/291 |
| D636,295 S * | 4/2011 | Eck | ................. | D12/1 |
| 8,464,827 B2* | 6/2013 | Tsumiyama | ......... | B62D 21/183 |
| | | | | 180/311 |
| 8,746,719 B2* | 6/2014 | Safranski | .................. | B60G 3/20 |
| | | | | 280/124.148 |
| 8,875,830 B2 | 11/2014 | Massicotte et al. | | |
| 8,997,908 B2 | 4/2015 | Kinsman et al. | | |
| 9,884,647 B2* | 2/2018 | Peterson | ................ | B62D 21/11 |
| 10,071,655 B2* | 9/2018 | Ito | ......................... | B62D 21/183 |
| D832,149 S * | 10/2018 | Wilcox | ........................ | D12/107 |
| 10,279,853 B2* | 5/2019 | Filion | .................. | B62D 65/024 |
| 10,518,630 B2* | 12/2019 | Uno | ........................ | B60K 11/04 |
| 10,618,404 B2* | 4/2020 | Laberge | .................. | B60K 11/08 |
| 2004/0013489 A1* | 1/2004 | Hansen | ..................... | B60P 1/64 |
| | | | | 410/77 |
| 2008/0023240 A1* | 1/2008 | Sunsdahl | ................. | B60K 5/12 |
| | | | | 180/68.2 |
| 2008/0023249 A1 | 1/2008 | Sunsdahl et al. | | |
| 2008/0283326 A1* | 11/2008 | Bennett | .................... | B60G 3/20 |
| | | | | 180/246 |
| 2008/0308334 A1 | 12/2008 | Leonard et al. | | |
| 2010/0314191 A1* | 12/2010 | Deckard | ................ | B60R 21/13 |
| | | | | 180/312 |
| 2011/0240394 A1 | 10/2011 | Hurd et al. | | |
| 2011/0298189 A1* | 12/2011 | Schneider | ............... | B60R 21/13 |
| | | | | 280/80.1 |
| 2012/0193163 A1* | 8/2012 | Wimpfheimer | ....... | B62D 21/183 |
| | | | | 180/233 |
| 2012/0223500 A1* | 9/2012 | Kinsman | .................. | B60G 7/02 |
| | | | | 280/124.153 |
| 2013/0048407 A1* | 2/2013 | Kuramoto | ................ | B60K 5/02 |
| | | | | 180/292 |
| 2013/0175779 A1* | 7/2013 | Kvien | .................... | B60G 7/001 |
| | | | | 280/124.15 |
| 2013/0319785 A1* | 12/2013 | Spindler | ................ | B60K 15/03 |
| | | | | 180/292 |
| 2014/0103627 A1* | 4/2014 | Deckard | .................... | F16B 7/18 |
| | | | | 280/807 |
| 2014/0353956 A1* | 12/2014 | Bjerketvedt | ............. | B60N 2/24 |
| | | | | 280/756 |
| 2015/0047917 A1* | 2/2015 | Burt, II | .................... | B60K 5/00 |
| | | | | 180/292 |
| 2015/0061275 A1* | 3/2015 | Deckard | ................ | B62D 29/00 |
| | | | | 280/788 |
| 2015/0259011 A1* | 9/2015 | Deckard | ................ | B60J 5/0487 |
| | | | | 280/781 |
| 2016/0144761 A1* | 5/2016 | Olli | .................... | B62D 33/0276 |
| | | | | 296/183.1 |
| 2016/0332495 A1* | 11/2016 | Franker | .................. | B60G 11/48 |
| 2017/0028881 A1* | 2/2017 | Proulx | .................... | B60N 2/803 |
| 2017/0029035 A1* | 2/2017 | Dube | ...................... | B60R 11/00 |
| 2017/0029036 A1* | 2/2017 | Proulx | .................... | B60R 11/00 |
| 2017/0174027 A1* | 6/2017 | Mailhot | .................. | B62D 3/12 |
| 2018/0009500 A1* | 1/2018 | Lovold | ..................... | B62J 17/00 |
| 2018/0147966 A1* | 5/2018 | Reed | .................... | B62D 47/003 |
| 2018/0178677 A1* | 6/2018 | Swain | .................. | B62D 21/183 |
| 2018/0312025 A1* | 11/2018 | Danielson | ............ | B60G 21/055 |
| 2018/0326843 A1* | 11/2018 | Danielson | ............ | F16H 57/035 |
| 2019/0185077 A1* | 6/2019 | Smith | .................. | B62D 21/183 |
| 2019/0211915 A1* | 7/2019 | Davis | .................. | B62D 21/183 |
| 2019/0291572 A1* | 9/2019 | Denis | .................... | B60K 15/00 |
| 2019/0300071 A1* | 10/2019 | St-Pierre | .............. | B62D 25/082 |
| 2019/0375463 A1* | 12/2019 | Upah | .................. | B62D 25/088 |
| 2019/0383248 A1* | 12/2019 | Bouchard | ............. | B60K 13/02 |
| 2020/0017153 A1* | 1/2020 | Barkey | ................ | B62D 23/005 |

OTHER PUBLICATIONS

English translation of RU157516U1 retrieved from https://patents.google.com/patent/RU157516U1/en?oq=RU157516 on Aug. 28, 2020.
English translation of CN104703865A retrieved from https://patents.google.com/patent/CN104703865A/en? pq=CN104703865 on Aug. 28, 2020.
Grant Decision dated Jul. 27, 2020 from the Rospatent in connection with the corresponding application No. 2019101867 and including references.

* cited by examiner

VEHICLE HAVING A REMOVABLE PANEL ASSEMBLY

CROSS-REFERENCE

This application claims priority to U.S. Provisional Patent Application No. 62/369,885, filed Aug. 2, 2016, entitled, "Vehicle Having a Removable Panel Assembly," the entirety of which is incorporated herein by reference.

FIELD OF TECHNOLOGY

The present technology relates to vehicles having removable panel assemblies.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a rear mounted engine.

These rear mounted engines are covered by a collection of panels or cowlings and portions of the frame, generally including a cargo platform. In order for a user to access the engine for maintenance or repair, the panels, the frame portions, and the cargo platform often need to be removed. This involves unbolting each component from its surrounding components and from the frame, which can be quite time consuming.

Thus there is a desire for a vehicle with panels and portions of the frame which allow for convenient access to a rear mounted engine.

SUMMARY

It is an object of the present technology to ameliorate at least some of the inconveniences present in the prior art.

According to one aspect of the present technology, there is provided a vehicle comprising a frame; a driver seat connected to the frame; a plurality of ground engaging members operatively connected to the frame; a motor operatively connected to at least one of the wheels, the motor being disposed rearward of the driver seat; and a panel assembly connected to the frame, the motor being accessible to a user when the panel assembly is removed, the panel assembly including at least a cargo platform, a left side panel connected to a left side of the cargo platform, and a right side panel connected to a right side of the cargo platform, the panel assembly and a portion of the frame being selectively removable from the vehicle as a unit.

In some implementations of the present technology, the portion of the frame comprises a cross-member disposed under the cargo platform; a left leg, a first end of the left leg being connecting to a roll cage of the vehicle, a second end of the left leg being connected to a left end of the cross-member, the left leg passing through the left side panel; and a right leg, a first end of the right leg being connecting to the roll cage of the vehicle, a second end of the right leg being connected to a right end of the cross-member, the right leg passing through the right side panel.

In some implementations of the present technology, the left leg extends upward and forward from the second end of the left leg to the first end of the left leg; and the right leg extends upward and forward from the second end of the right leg to the first end of the right leg.

In some implementations of the present technology, the panel assembly further comprises a rear facia panel connected to the cargo platform.

In some implementations of the present technology, the rear facia panel extends below the cargo platform and is disposed rearward of the motor.

In some implementations of the present technology, at least two ground engaging members of the plurality of ground engaging members are a rear left wheel and a rear right wheel; a top portion of the rear left wheel is disposed longitudinally between a portion of the left side panel and a left end of the rear facia panel; and a top portion of the rear right wheel is disposed longitudinally between a portion of the right side panel and a right end of the rear facia panel.

In some implementations of the present technology, the left and right side panels are generally L-shaped.

In some implementations of the present technology, the left and right side panels extend vertically higher than a top surface of the cargo platform.

In some implementations of the present technology, the cargo platform is selectively separable from the left and right side panels.

In some implementations of the present technology, when the panel assembly is connected to the vehicle, the motor is under the cargo platform and laterally between the left and right side panels.

In some implementations of the present technology, the vehicle further comprises a right door connected to the frame and a left door connected to the frame and the right side panel connects to the frame near a hinge of the right door and the left side panel connected to the frame near a hinge of the left door.

In some implementations of the present technology, the left side panel is a first left side panel; and the right side panel is a first right side panel; the vehicle further comprising a second left side panel connected to a left side of the frame and extending at least in part forward of the first left side panel; a first left fastener connecting a forward end of the first left side panel to the frame; a second left fastener connecting the forward end of the first left side panel to the second left side panel; a second right side panel connected to a right side of the frame and extending at least in part forward of the first right side panel; a first right fastener connecting a forward end of the first right side panel to the frame; and a second right fastener connecting the forward end of the first right side panel to the second right side panel.

In some implementations of the present technology, the frame comprises a front frame portion; a central frame portion connected to the front frame portion and being disposed rearward of the front frame portion; and a rear frame portion connected to the central frame portion and being disposed rearward of the central frame portion; wherein the motor is mounted to the rear frame portion; and the panel assembly partially surrounds the rear frame portion when the panel assembly is connected to the vehicle.

According to another aspect of the present technology, there is provided a method of accessing a motor of a vehicle having a frame. The method comprising disconnecting a panel assembly from the vehicle, the panel assembly including a cargo platform, a left side panel connected to a left side of the cargo platform, and a right side panel connected to a right side of the cargo platform, the panel assembly selectively covering the motor, the motor being disposed rearward of a driver seat of the vehicle, the panel assembly being removable without separation of the left and right side panels from the cargo platform; disconnecting a portion of the frame from a remainder of the frame; and withdrawing the panel assembly and the portion of the frame as a unit away from the vehicle for exposing the motor.

In some implementations of the present technology, disconnecting the panel assembly from the vehicle includes removing at least a first fastener connecting the left side panel to the frame; and removing at least a second fastener connecting the right side panel to the frame.

In some implementations of the present technology, the portion of the frame comprises a cross-member disposed under the cargo platform, a left leg connected to a left end of the cross-member, the left leg passing through the left side panel, and a right leg connected to a right end of the cross-member, the right leg passing through the right side panel, and the disconnecting the portion of the frame from the remainder of the frame comprises disconnecting an end of the left leg from a remainder of the frame, and disconnecting an end of the right leg from the remainder of the frame.

In some implementations of the present technology, the disconnecting the end of the left leg from the remainder of the frame comprises disconnecting the end of the left leg from a roll cage of the frame and the disconnecting the end of the right leg from the remainder of the frame comprises disconnecting the end of the right leg from the roll cage of the frame.

In some implementations of the present technology, the panel assembly further comprises a rear facia panel connected to the cargo platform; and the disconnecting a panel assembly from the vehicle includes disconnecting the rear facia panel from the frame.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
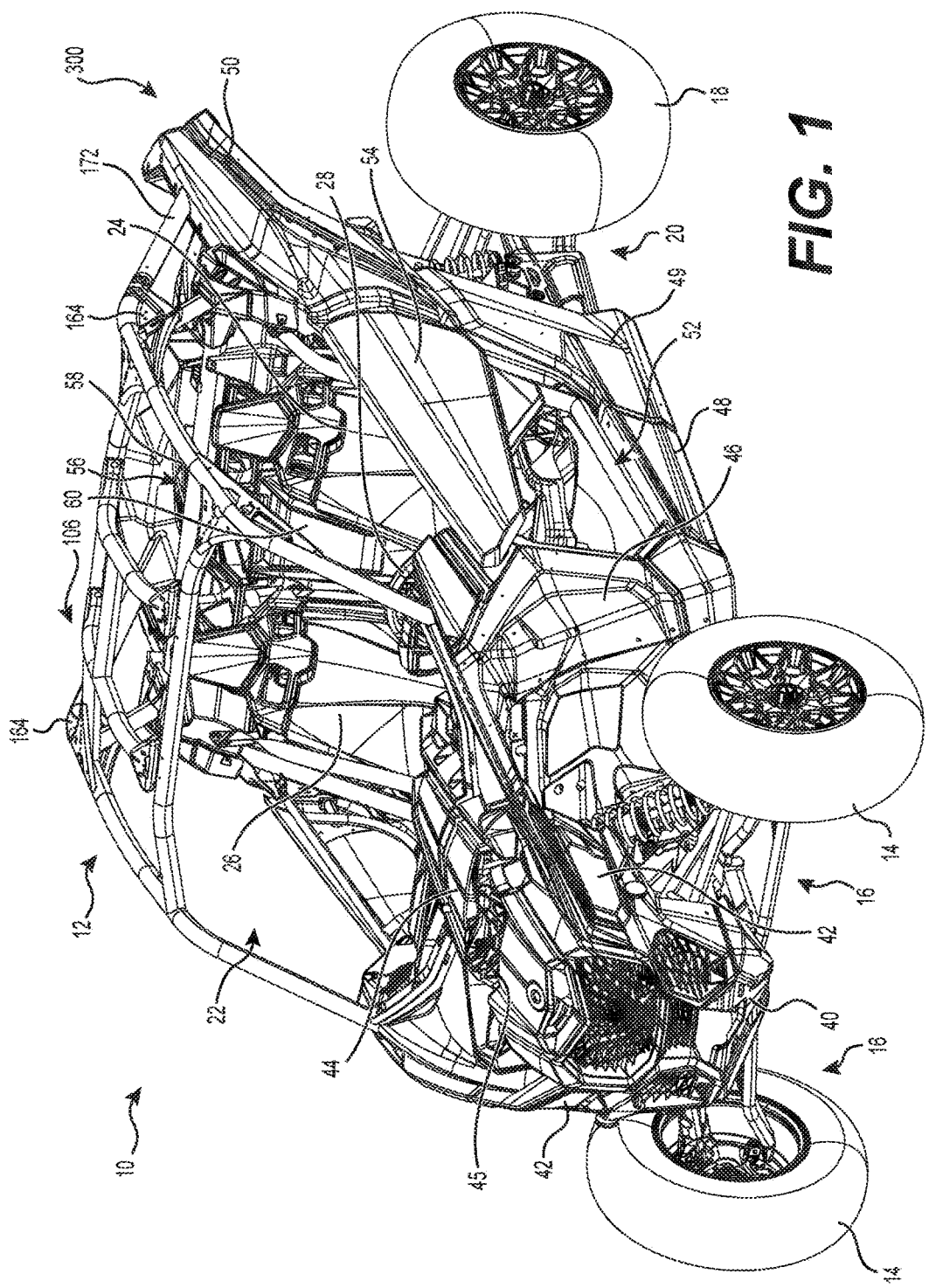
FIG. 1 is a perspective view of an off-road vehicle taken from a front, left side.

The present technology will be described with respect to a four-wheel off-road vehicle 10 having two side-by-side seats and a steering wheel. However, it is contemplated that some aspects of the present technology may apply to other types of vehicles such as, but not limited to, off-road vehicles having a handlebar and a straddle seat (i.e. an all-terrain vehicle (ATV)), off-road vehicles having ground engaging members other than wheels, and off-road vehicles having more or less than four wheels, as well as on-road vehicles with rear-mounted engines and motors.

The general features of the off-road vehicle 10 will be described with respect to FIGS. 1 to 6. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 6:
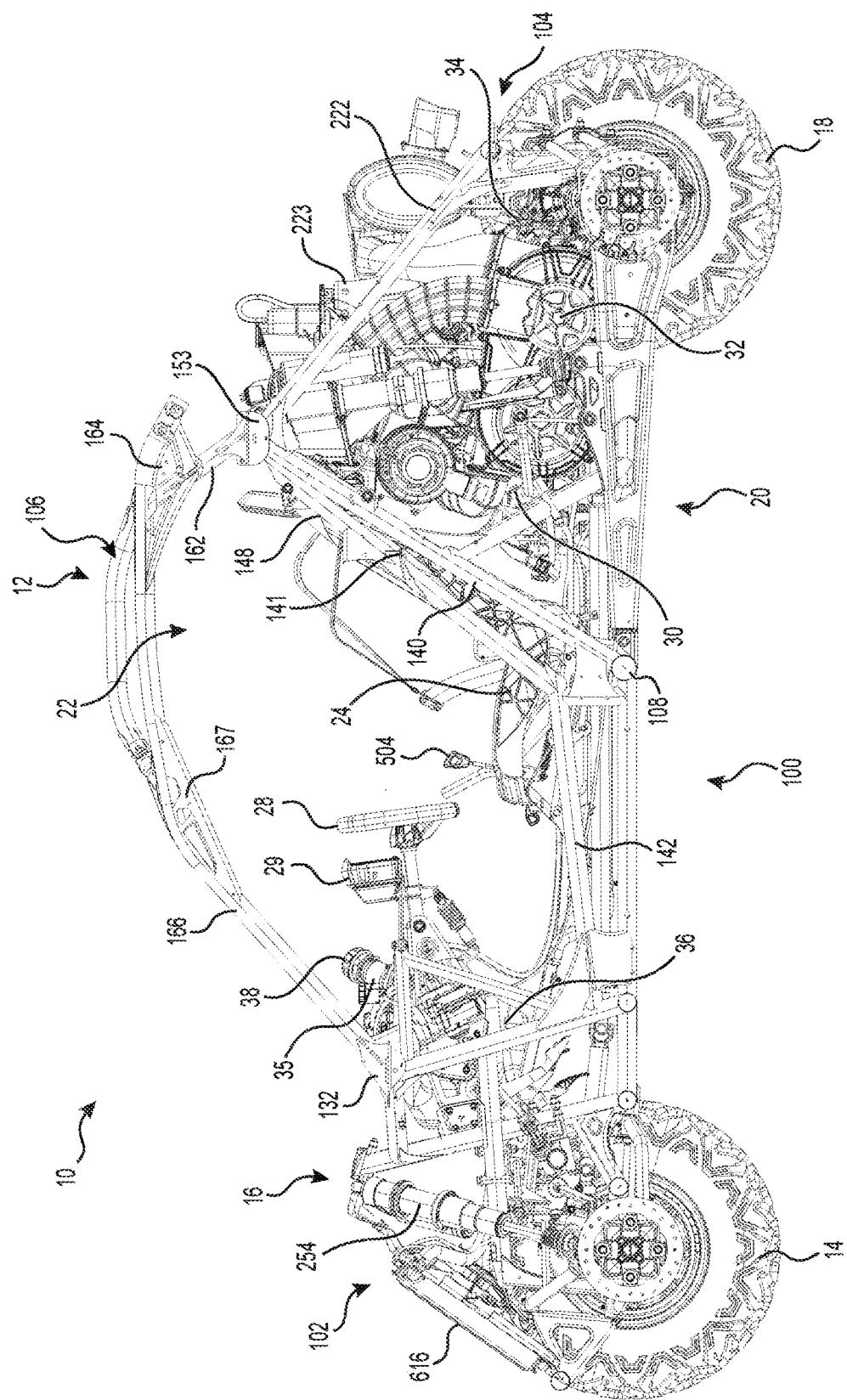
FIG. 6 is a left side elevation view thereof with body panels and the left wheels removed.

A motor 30, more specifically an engine 30, is connected to the frame 12 in a rear portion of the vehicle 10, as can be best seen in FIG. 6. The engine 30 is connected to a continuously variable transmission (CVT) 32 disposed on a left side of the engine 30. The CVT 32 is operatively connected to a transaxle 34 to transmit torque from the engine 30 to the transaxle 34. The transaxle 34 is disposed behind the engine 30. The transaxle 34 is operatively connected to the front and rear wheels 14, 18 to propel the vehicle 10. A fuel tank 36 is suspended from the frame 12 in front of the passenger seat 26. The fuel tank 36 is disposed above the floor of the cockpit area 22 of the vehicle 10. A filler neck 35 that is selectively closed by a cap 38 extends upward, rightward and rearward from a top, right and rear portion of the fuel tank 36. A radiator 616 is connected to the front portion of the frame 102 and the bumper frame assembly 179. The radiator 616 is used to cool engine coolant used to cool the engine 30. The engine 30 is a combustion engine 30, but it is contemplated that in some implementations the engine 30 could be replaced by another type of motor, including but not limited to, an electric motor and a hybrid electric-combustion motor system.

Various body panels are connected to the frame 12 of the vehicle 10. These panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude as will be described in greater detail below. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18.

Figure 2:
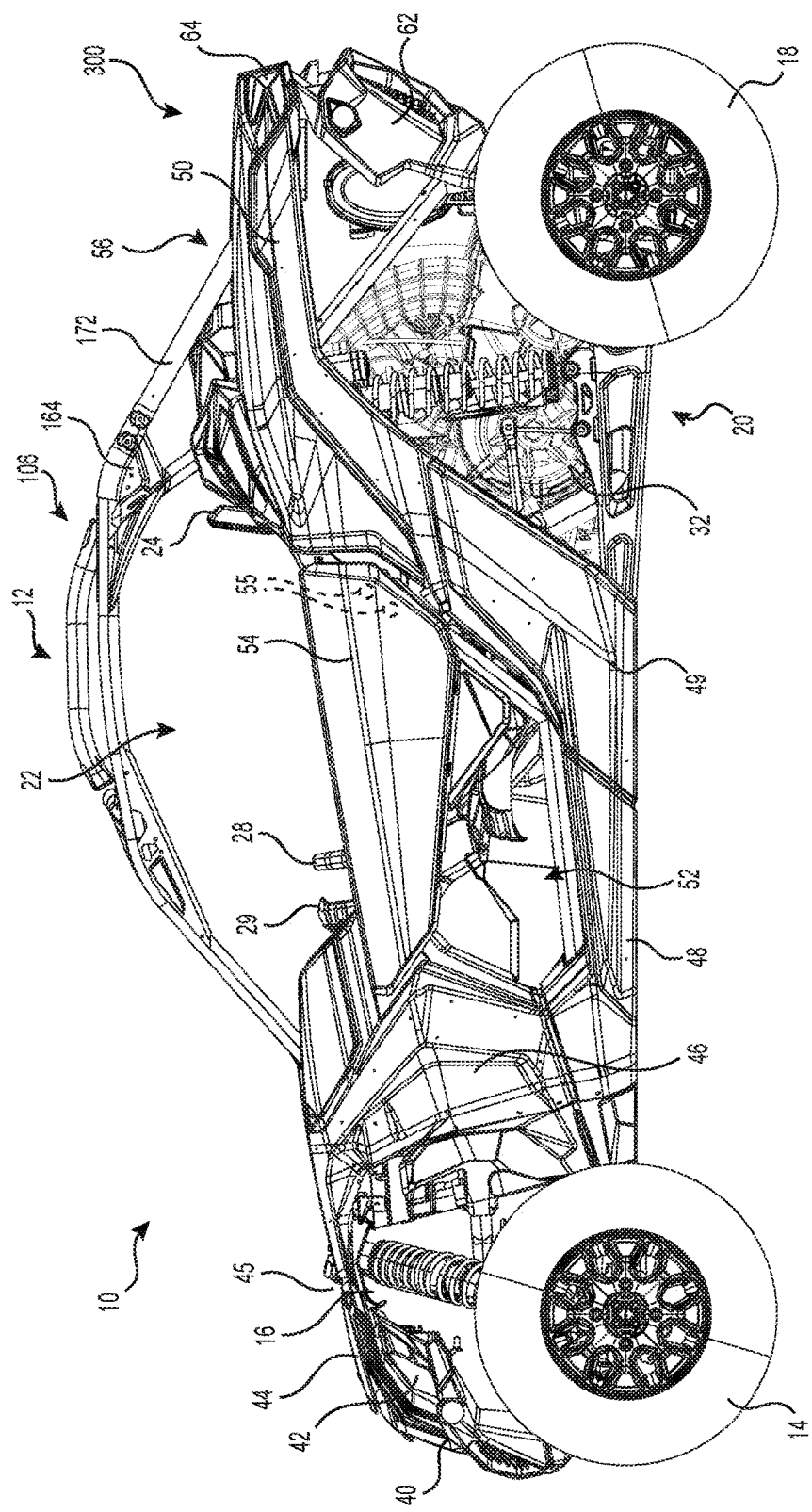
FIG. 2 is a left side elevation view thereof.
Figure 3:
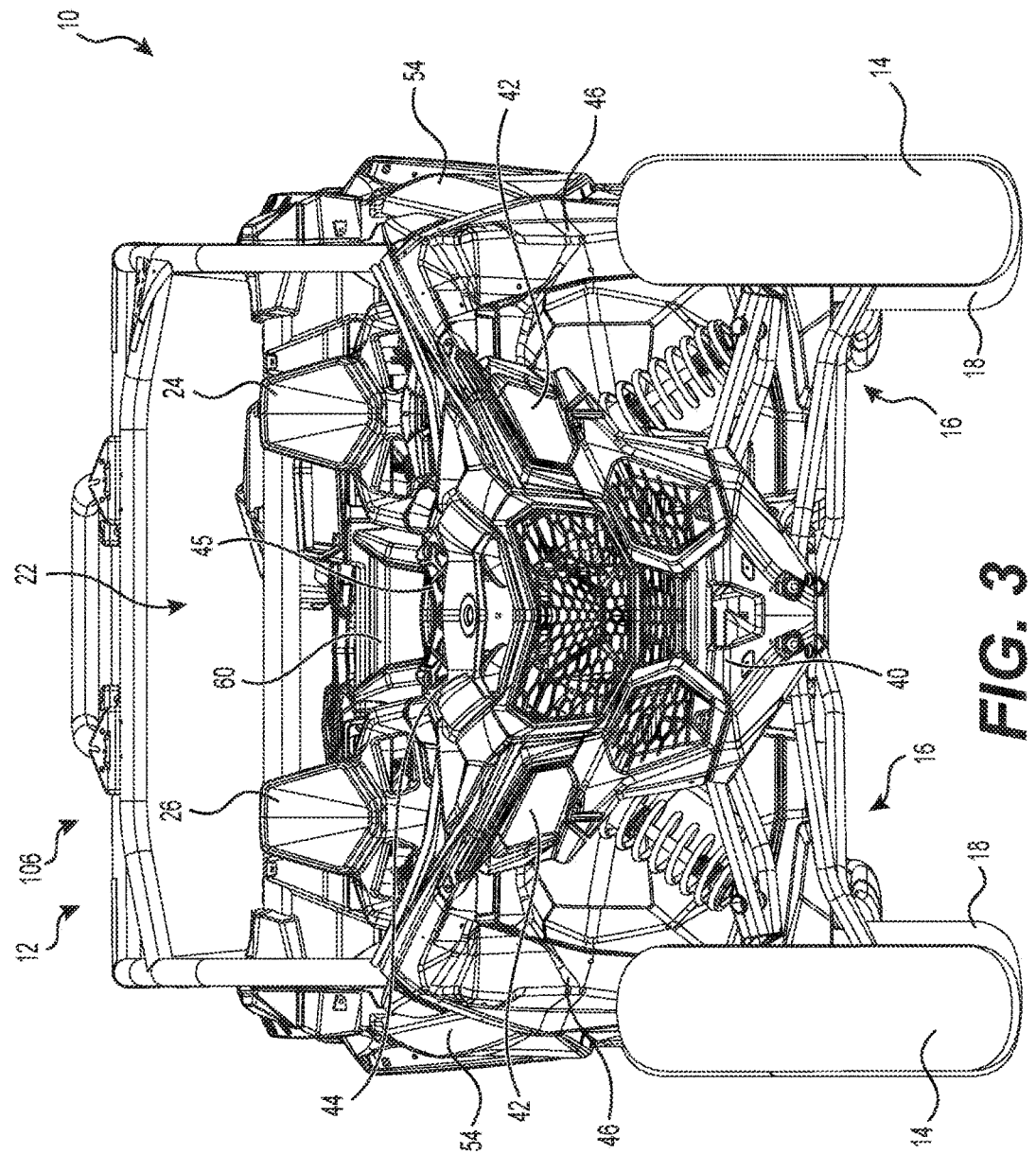
FIG. 3 is a front elevation view thereof.
Figure 4:
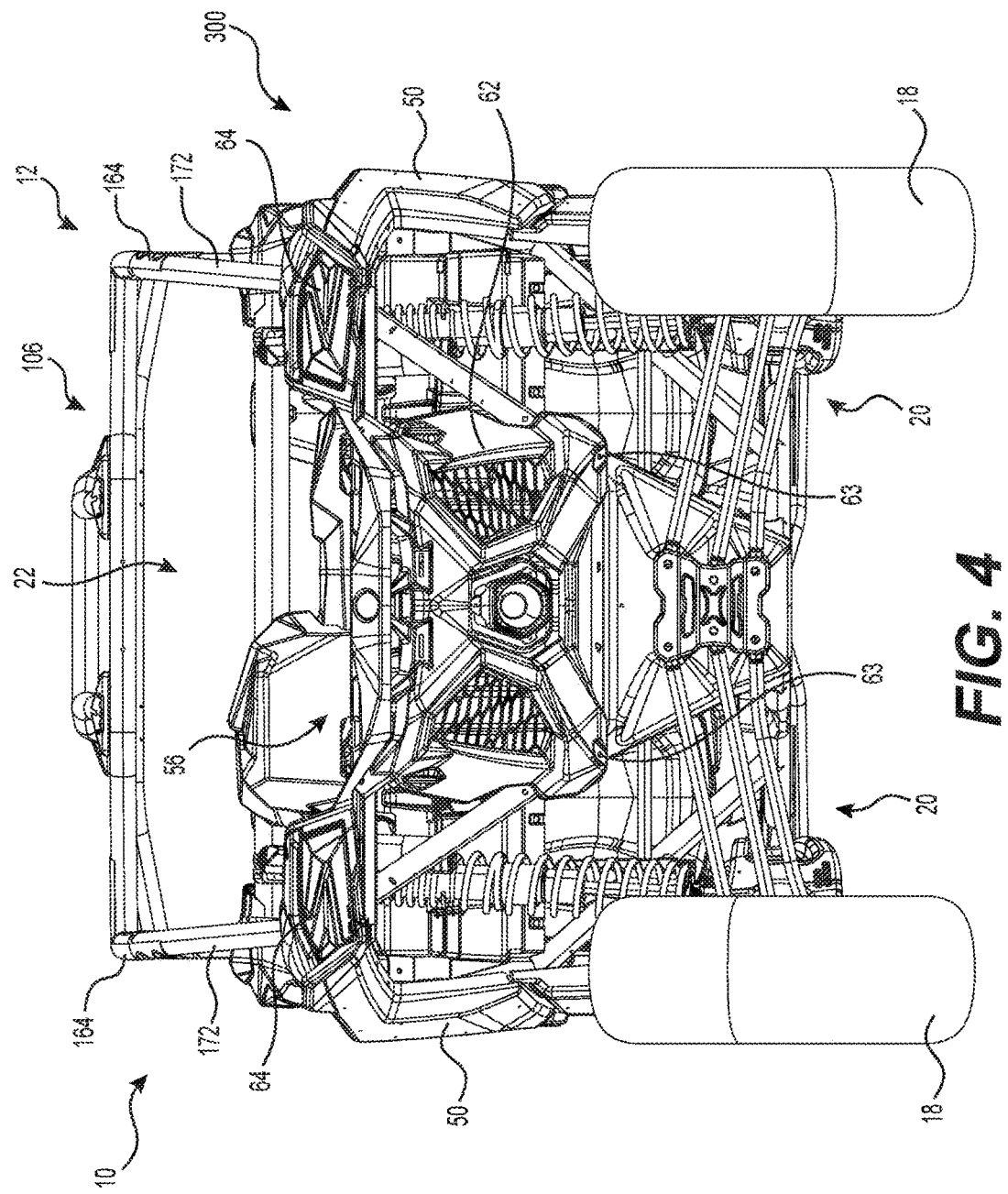
FIG. 4 is a rear elevation view thereof.

As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. Generally L-shaped rear panels 50, also referred to herein as rear fenders 50, extend upward and then rearward from the rear, upper ends of the L-shaped panels 49. The rear fenders 50, specifically a right rear panel 50 and a left rear panel 50, define a cargo space 56 therebetween behind the seats 24, 26, including a cargo platform 58. A rear panel 62, also referred to as the rear facia 62, is disposed laterally between the rear wheels 18, extending generally downward from the cargo platform 58. A separation panel 60 extends laterally and is disposed longitudinally between the seats 24, 26 and the cargo platform 58. The rear fenders 50, the cargo platform 58, and the rear facia 62 will be described in more detail below.

On each side of the vehicle 10, the front fender 46, the lower panel 48, the L-shaped panel 49 and the rear fender 50 define a passage 52 through which a driver or passenger can enter or exit the vehicle 10. Each side of the vehicle 10 is provided with a door 54 that selectively closes an upper portion of the corresponding passage 52. Each door 54 has two hinges 55 (shown schematically in FIG. 2) at a rear thereof, connected to brackets 92 (FIGS. 7 and 8) connected to the member 148. It is contemplated that each door 54 could be connected to the frame 12 via a single hinge. Each door 54 is selectively connected at a front thereof to a frame element 94 via a releasable latch (not shown) provided in the door 54. It is contemplated that each door 54 could be hinged at a front thereof and latched at a rear thereof.

Figure 7:
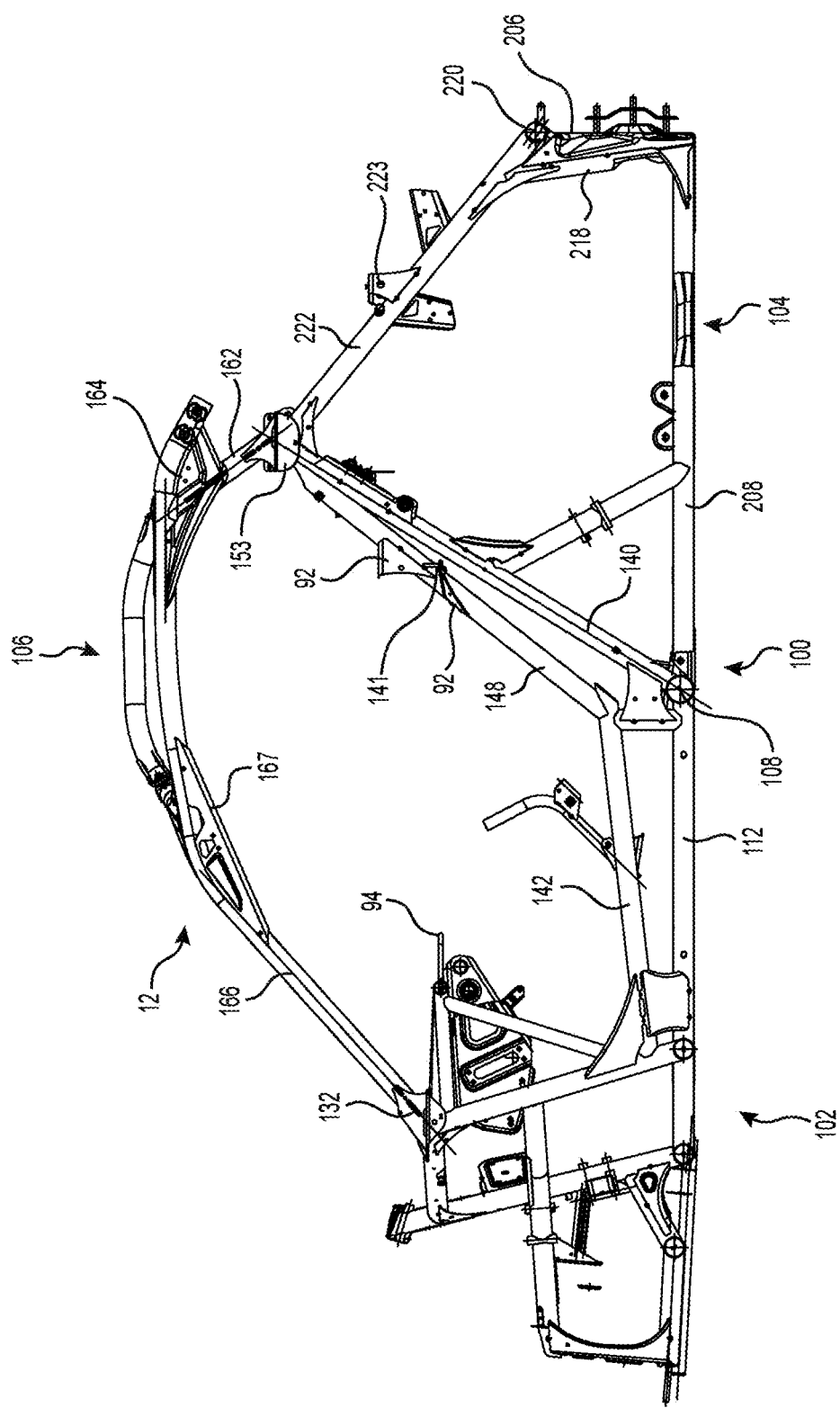
FIG. 7 is a left side elevation view of portions of a frame of the vehicle of FIG. 1.
Figure 8:
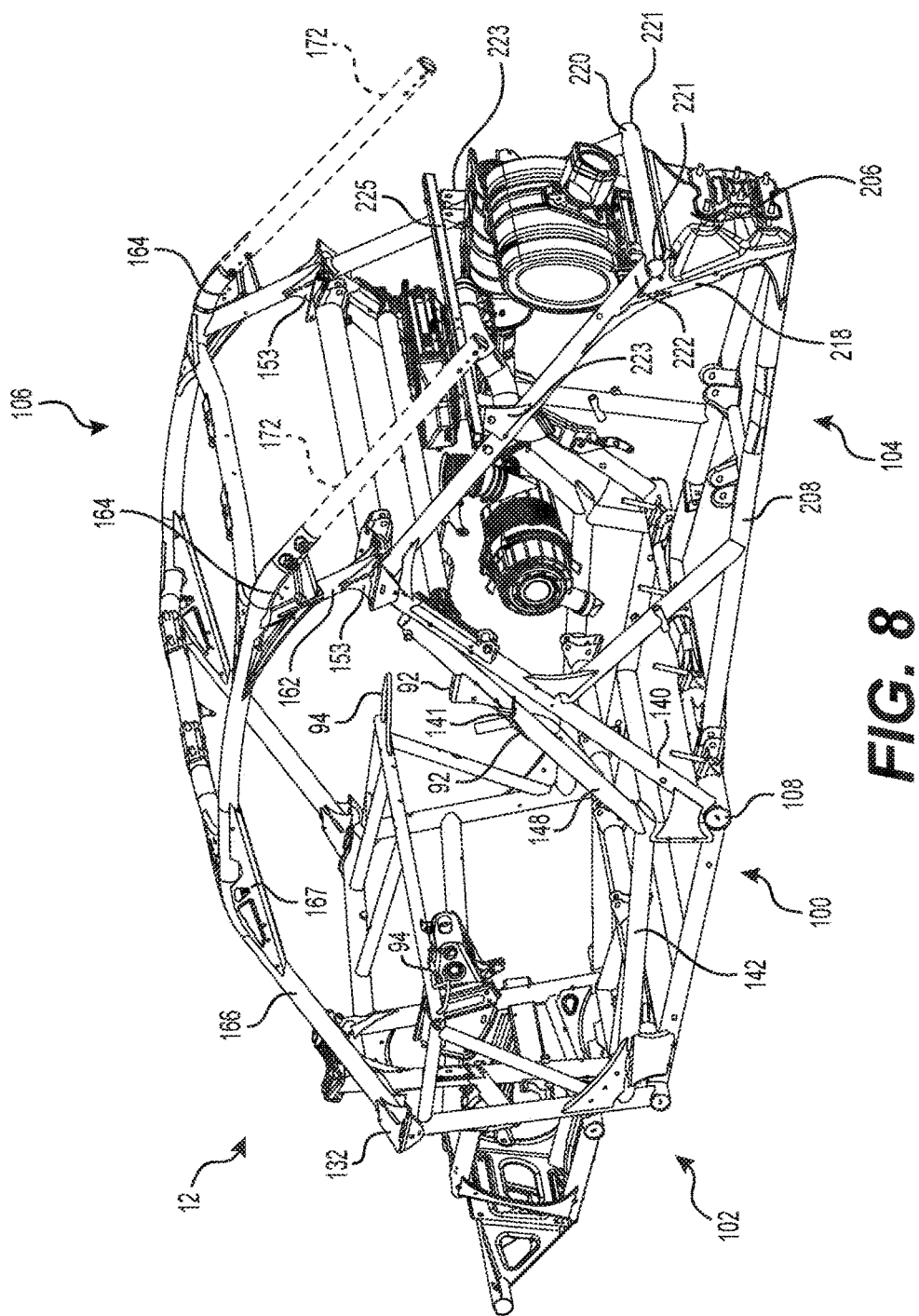
FIG. 8 is a perspective view, taken from a rear, left side, of the frame and other internal components of the vehicle of FIG. 1.

Turning now to FIGS. 6 to 8, portions the frame 12 of the vehicle 10 will be described in more detail. The frame 12 has a central portion 100, a front portion 102 and a rear portion 104. As their names suggest, the front portion 102 is disposed in front of the central portion 100 and the rear portion 104 is disposed behind the central portion 100. The central portion 100 defines the cockpit area 22 in which the seats 24, 26 are disposed. The central portion 100 also defines a roll cage 106. The front suspension assemblies 16 are connected to the central and front portions 100, 102 of the frame 12. The engine 30, the CVT 32 and the transaxle 34 are supported by the rear portion 104 of the frame 12. The rear suspension assemblies 20 are connected to the central and rear portions 100, 104 of the frame 12.

The roll cage 106 is connected at its front to the brackets 132 and at its rear to the brackets 153. Legs 162 are connected to and extend upward and forward from the brackets 153. The upper ends of the legs 162 are received in and connected to connectors 164. Legs 166 are connected to and extend upward and rearward from the brackets 132. The upper ends of the legs 166 are received in and connected to the connectors 164. As best seen in FIG. 8, the legs 166 are bent near their center points. Brackets 167 are provided at the bend in the legs 166. As can be seen in FIGS. 1 and 2, legs 172 connect to the connectors 164 and extend rearward, downward and laterally inward therefrom. The legs 172 will be described in more detail below.

Sections of the central portion 100 of the frame 12 will now be described. The central portion 100 has a laterally extending bottom member 108. Rear members 140 extend upward and rearward from the ends of the bottom member 108. Side members 148 are connected to the upper portion of the rear members 140. From the rear members 140, the side members 148 extend downward and forward and connect to the rear ends of side members 142.

Sections of the rear portion 104 of the frame 12 will now be described. The rear portion 104 has two bottom members 208 connecting to and extending rearward and laterally inward from the rear of the bottom member 108 of the central portion 100 of the frame 12. Two members 218 are connected to the rear ends of the members 208. From the members 208, the members 218 extend upward, forward and laterally outward. A mounting bracket 206 extends from the members 218 for added structural rigidity. Two members 222 are connected to the top ends of the members 218. Each member 222 includes a bracket 223 to which the cargo platform 58 is fastened via a cross-member 225 (FIG. 8). A laterally extending member 220 is connected to the rear ends of the members 222. The member 220 is disposed rearward of the members 218 and lower than the top ends of the members 218 as can be seen in FIG. 8. The two members 222 are connected near the ends of the member 220. From the member 220, the members 222 extend forward, upward and laterally outward.

The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

A panel assembly 300 and portions of the frame 12 will now be described with reference to FIGS. 9 to 12. The panel assembly 300 is made up of the left fender 50, the right fender 50, and the cargo platform 58. The panel assembly 300 partially surrounds the rear frame portion 104 when the panel assembly 300 is connected to the vehicle 10. Portions of the frame 12 pass through and support the panel assembly 300, as will be described in more detail below.

Figure 12:
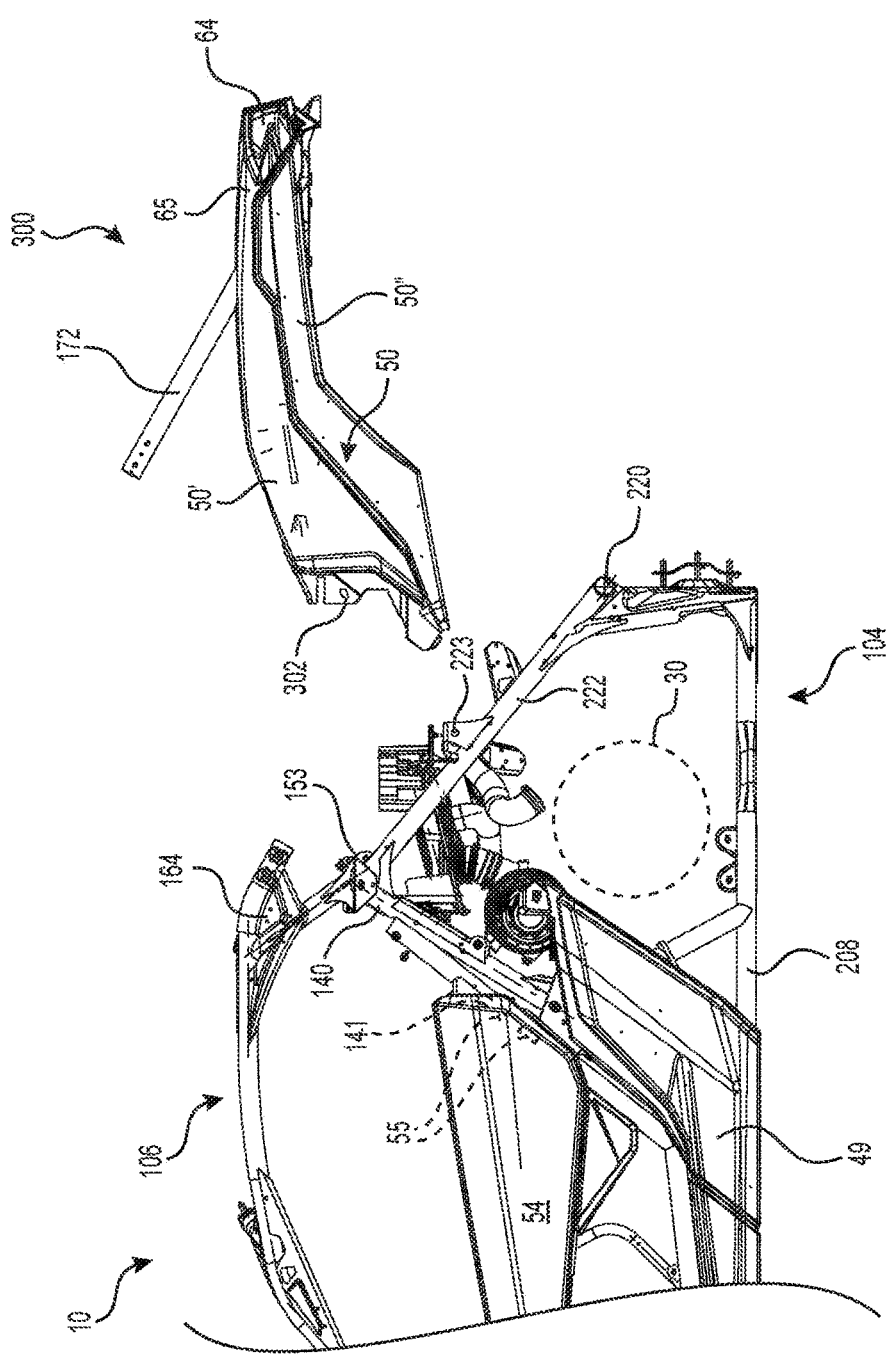
FIG. 12 is a left side elevation view of a portion of the vehicle of FIG. 1, with the panel assembly and the portion of the frame of FIG. 9 shown withdrawn from the vehicle.

Each rear fender 50 is disposed in part above and in part forward of its corresponding rear wheel 18. The rear fenders 50 define apertures at the rear thereof to receive the brake lights 64 of the vehicle 10. The brake lights 64 are operatively connected to an electrical system (not shown) of the vehicle 10 via electrical connections 65 (shown schematically in FIG. 12) that must be disconnected when the fenders 50 are removed, as will be described below. It is contemplated that the brake lights 64 could be replaced with reflectors or that reflectors could be provided in addition to the brake lights 64. Each fender 50 is fastened to the frame 12 near the hinges 55 of the door 54 at a point 141 by a fastener 303 (see FIG. 10) received through an aperture 302 defined in the fender 50. It is contemplated that each fender 50 could be selectively connected to the frame 12 at more or less points. In some implementations, each fender 50 could be replaced by two fenders, a top fender 50' connected to a bottom fender 50", as shown in FIG. 12. In such an implementation, the aperture 302 is used to connect the fender 50' to the frame 12, while the fender 50" is connected to fender 50' via five apertures 304 with fasteners 305, the apertures 304 and fasteners 305 being illustrated in FIG. 10.

The cargo platform 58 is fastened to, and extends horizontally between, the brackets 223 via the cross-member 225. The cargo platform 58 is fastened to the cross-member 225 by four fasteners 227, received in four apertures 226 (illustrated in FIG. 11). Portions of the fenders 50 extend vertically higher than a top surface of the cargo platform 58 to define the cargo space 56, as mentioned above. It is contemplated that more or less of the fenders 50 may extend higher than the cargo platform 58. The cargo platform 58 is bolted to the fenders 50 by bolts 151 (see FIG. 9 for example). It is contemplated that fasteners other than the bolts 151 could be used. The panels 50 are selectively removable from the cargo platform 58, but as will be described below, do not need to be separated from the cargo platform 58 in order to be removed from the vehicle 10. It is contemplated that the panels 50, 58 could be connected by many means, selectively removable or not, including, but not limited to, plastic snap connections, rivets and spot welds. The cargo platform 58 has a plurality of apertures such that the cargo platform 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that hooks or loops could be provided instead of or in addition to the apertures in the cargo platform 58. It is also contemplated that the cargo platform 58 could not be provided with any attachment features.

Figure 9:
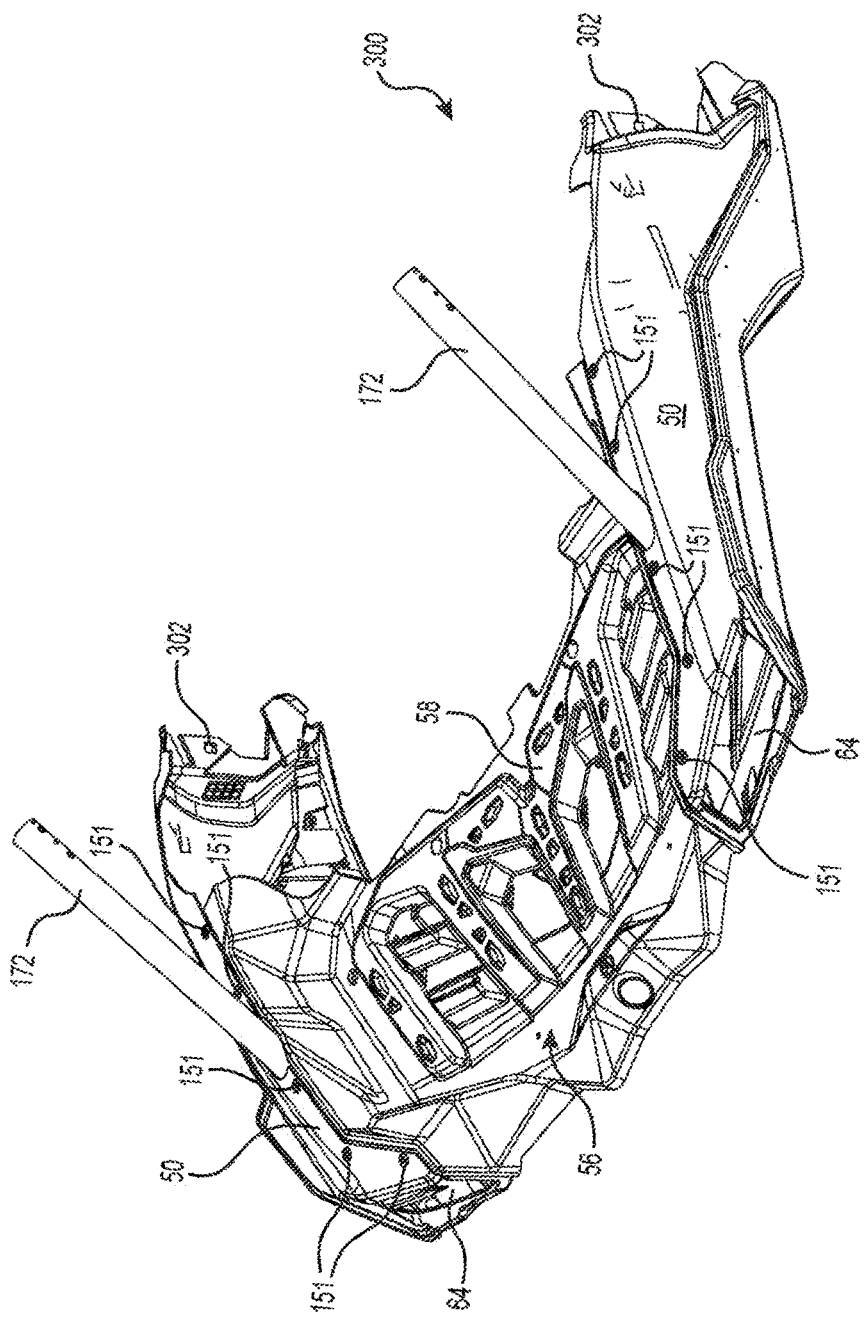
FIG. 9 is a perspective view, taken from a rear, right side, of a panel assembly and a portion of the frame of the vehicle of FIG. 1.
Figure 10:
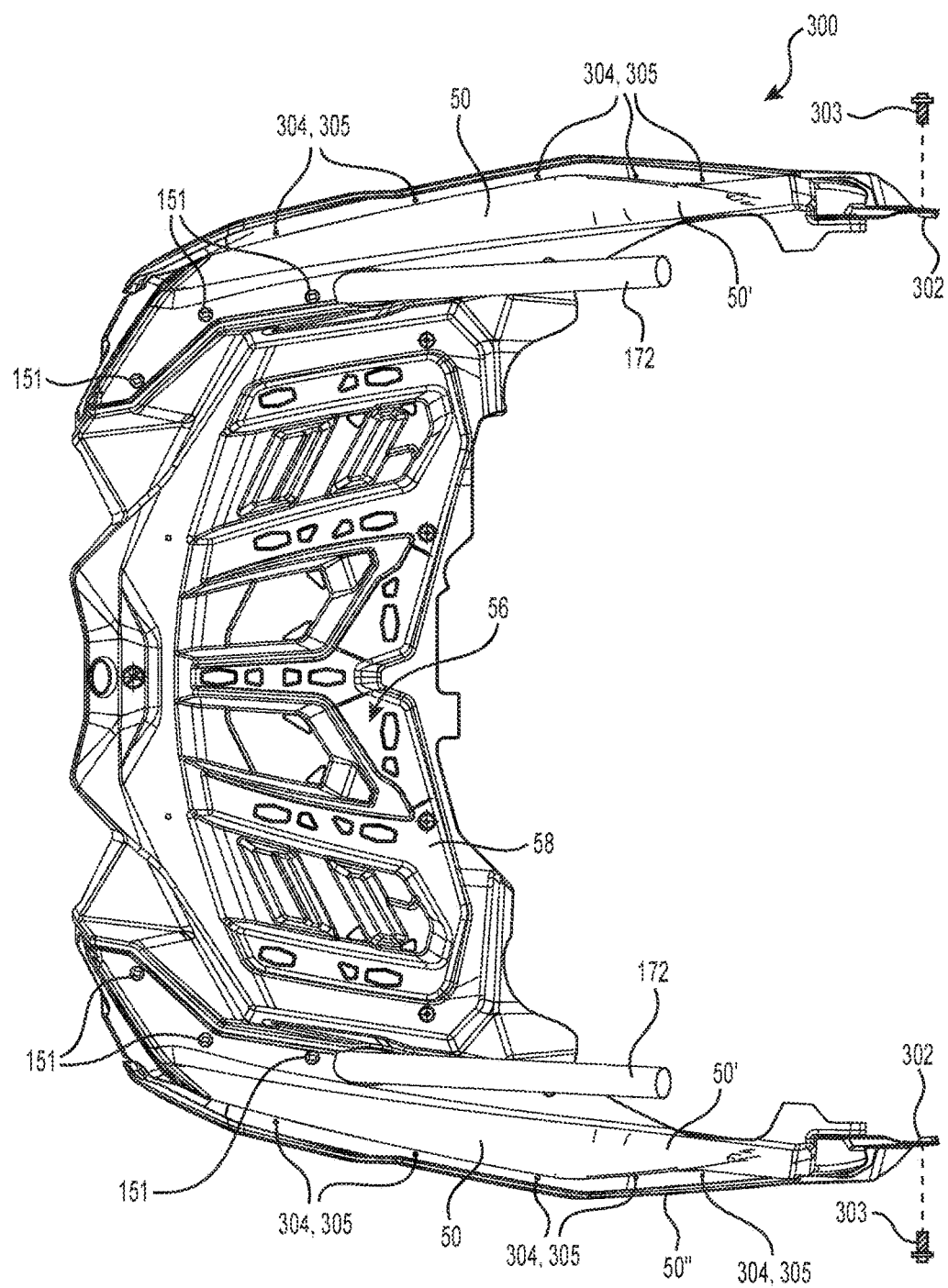
FIG. 10 is a top plan view of the panel assembly and the portion of the frame of FIG. 9.
Figure 11:
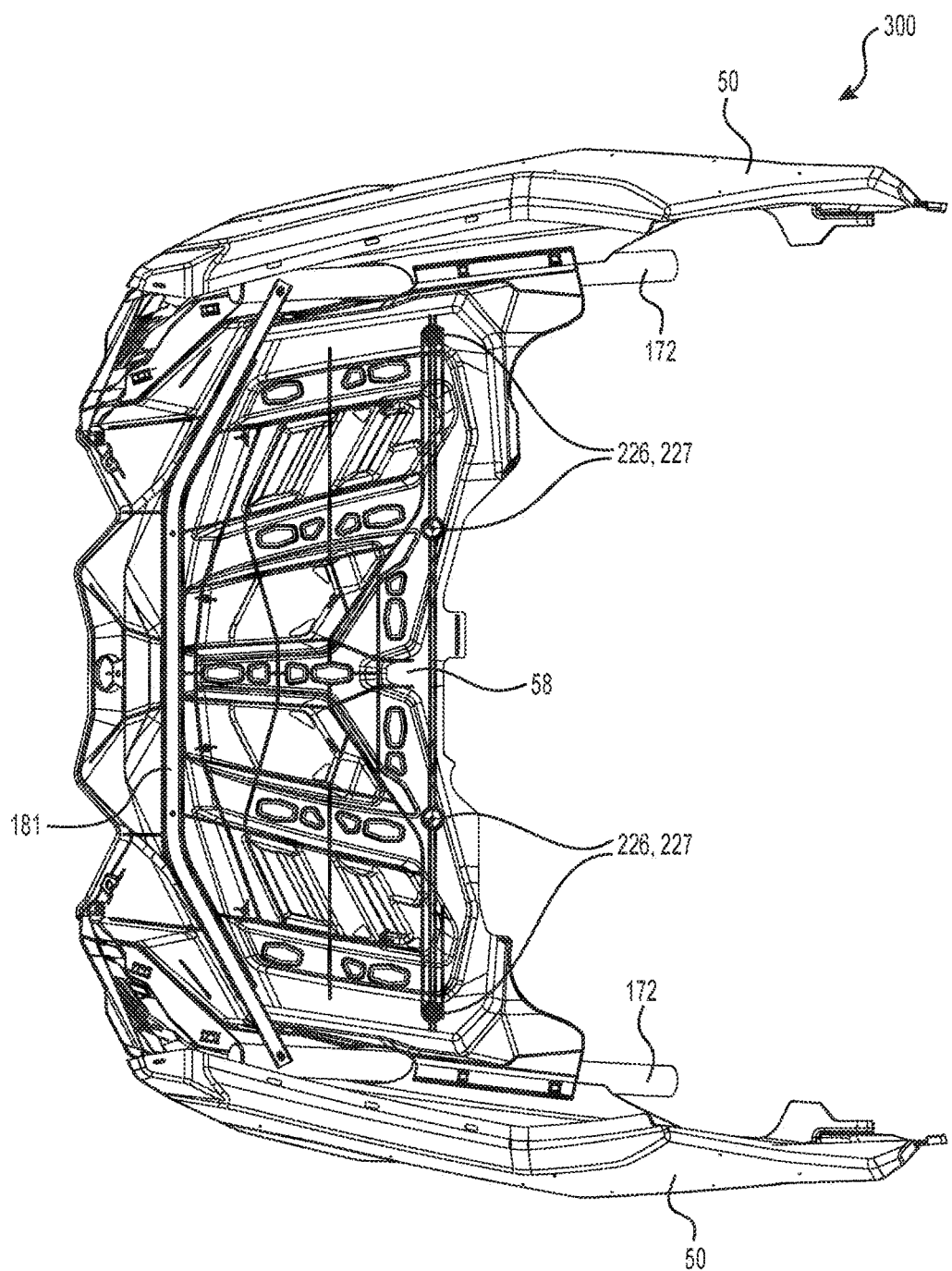
FIG. 11 is a bottom plan view of the panel assembly and the portion of the frame of FIG. 9.

Portions of the frame 12 pass through and support the panel assembly 300, as can best be seen in FIGS. 9 through 11. The legs 172 selectively connect to the brackets 164 of the roll cage 106 at their front ends and extend generally rearward and downward therefrom, as shown in FIG. 1 and schematically in FIG. 8. Each leg 172 passes through its corresponding rear fender 50 and connects at its rear end to a cross-member 181 disposed under the cargo platform 58. By being connected to the frame 12 via the legs 172, the cross-member 181 provides support for the cargo platform 58, as well as for additional loads which may be placed thereon.

Figure 5:
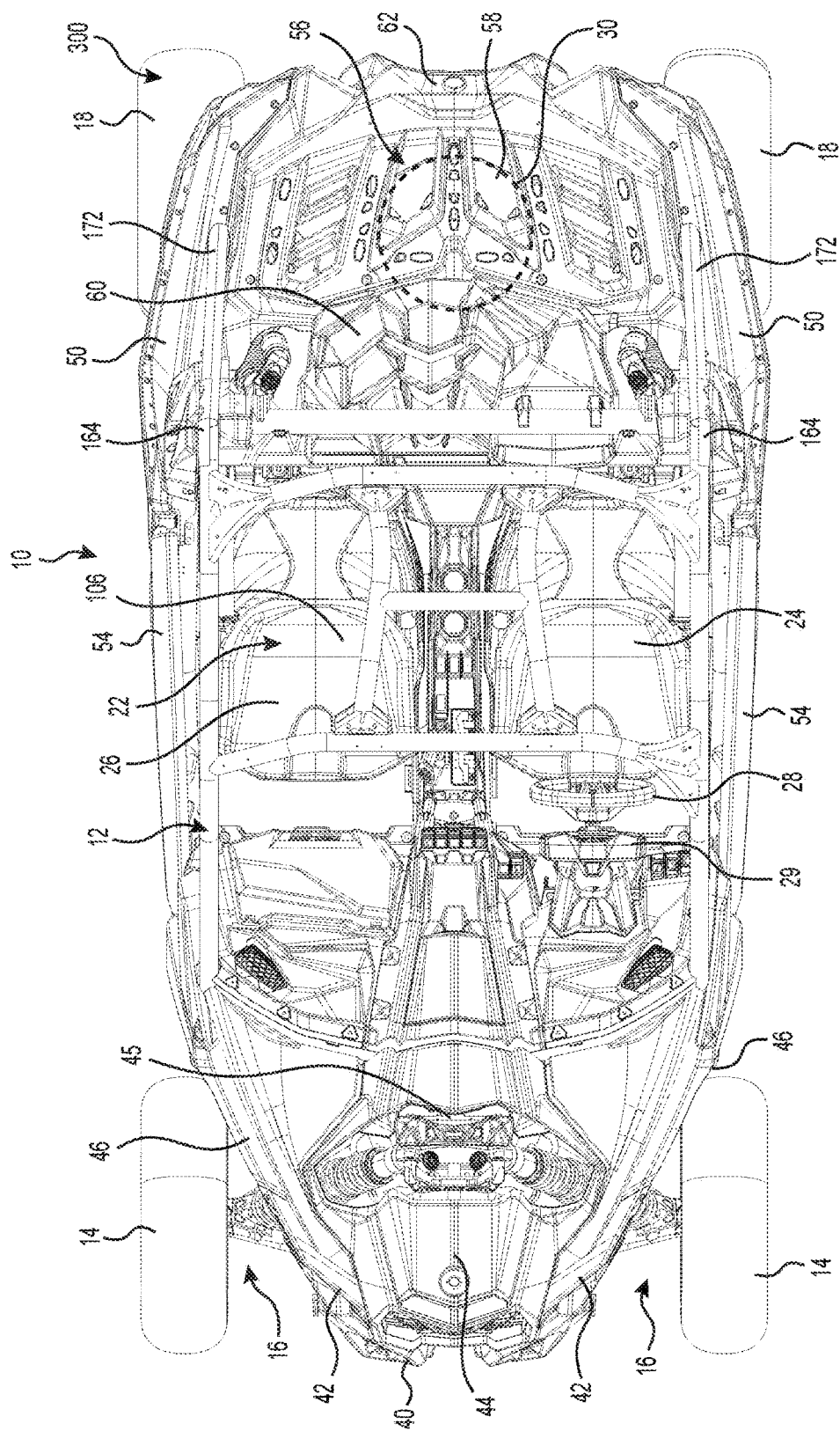
FIG. 5 is a top plan view thereof.

As is illustrated schematically in FIGS. 5 and 12, the engine 30 is disposed generally below the cargo platform 58 and between the rear fenders 50. As such, in order for a user to access the engine 30, the fenders 50, the cargo platform 58, and the corresponding portions of the frame 12 must be removed. By the present technology, the panel assembly 300 and the corresponding portions of the frame 12 are selectively removable as a unit (the unit being shown in FIG. 9), such that the user does not need to disconnect and separate each portion of the assembly 300, the legs 172, and the cross-member 181 individually.

Figure 13:
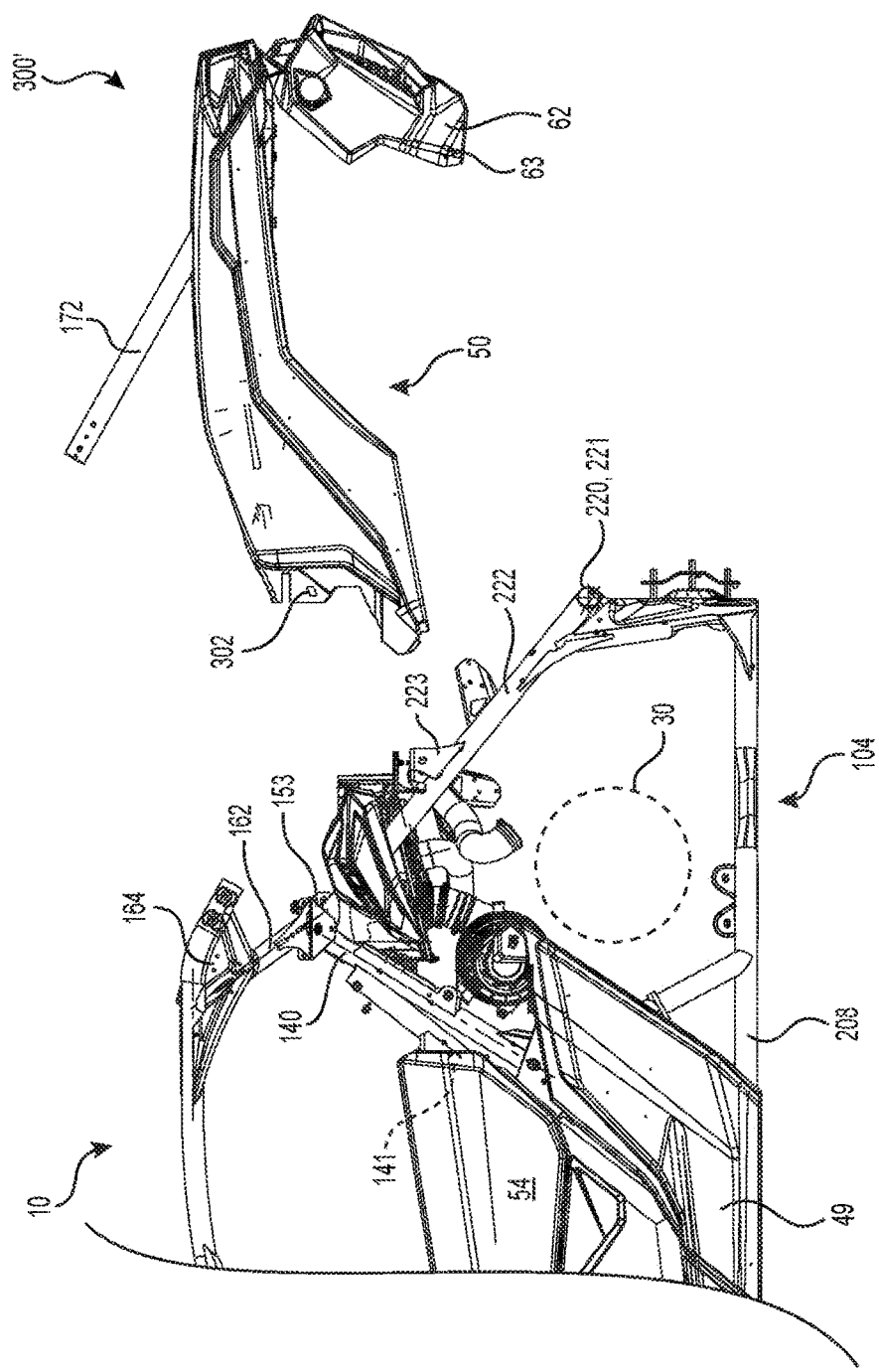
FIG. 13 is a left side elevation view of a portion of the vehicle of FIG. 1, with another panel assembly and the portion of the frame shown withdrawn from the vehicle.

Another panel assembly 300' and portions of the frame 12 are illustrated in FIG. 13. The panel assembly 300' is made up of the left fender 50, the right fender 50, the cargo platform 58 and the rear facia 62. The legs 172 and the cross-member 181 pass through and support the panel assembly 300' in the same way as described with respect to the panel assembly 300.

The rear facia 62 is disposed laterally between the rear wheels 18 behind the cargo platform 58. The rear facia 62 is selectively fastened to the cargo platform 58 by fasteners (not shown) on a top side and is fastened through two apertures 63 on a lower end of the facia 62 (FIG. 4) to two apertures 221 of the member 220 of the frame 12 (FIG. 8). As can be seen from FIG. 2, the rear facia 62 extends rearward such that a top portion of the rear left wheel 18 is disposed longitudinally between a portion of the left fender 50 and a left end of the rear facia 62 and a top portion of the rear right wheel 18 is disposed longitudinally between a portion of the right fender 50 and a right end of the rear facia 62.

In the implementation illustrated in FIG. 13 with panel assembly 300', the user can access the engine 30 by removing the fenders 50, the cargo platform 58, the corresponding portions of the frame 12 and the rear facia 62 as a unit. By the present technology, the panel assembly 300' and the corresponding portions of the frame 12 are selectively removable as a unit such that the user does not need to disconnect and separate each portion of the assembly 300', the legs 172, and the cross-member 181.

Figure 14:
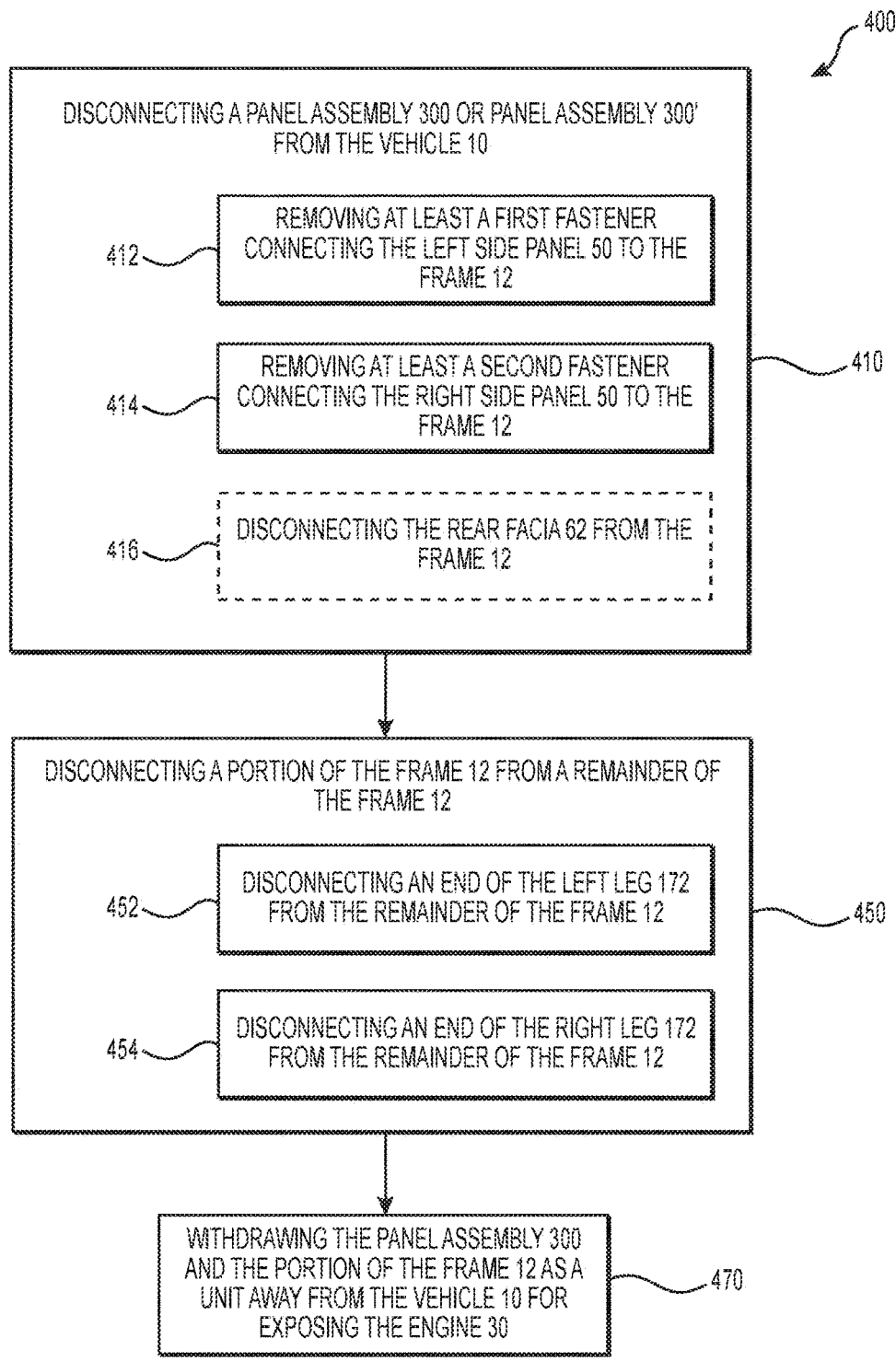
FIG. 14 is a flowchart of a method of accessing an engine of the vehicle of FIG. 1.

A method 400 of accessing the engine 30 of the vehicle 10 using the panel assemblies 300, 300' will now be described with respect to FIGS. 8 to 14. A schematic flowchart of the method 400 is illustrated in FIG. 14. As mentioned above, the panel assemblies 300, 300' are selectively removable as a unit, such that the user is not required to separate and remove each rear panel component 50, 58, and/or 62 individually. The description of the method 400 below will generally refer to the panel assembly 300, but applies similarly to the panel assembly 300'.

Specifically, the method 400 begins by disconnecting the panel assembly 300 from the vehicle 10 at step 410. The disconnecting at step 410 includes removing the fastener connecting the left fender 50 to the frame 12 through the aperture 302 at step 412 and removing the fastener connecting the right fender 50 to the frame 12 through the aperture 302 at step 414. It is contemplated that there may be more or less fasteners connecting the fenders 50 to the frame 12 and the method 400 would be adapted to disconnect the fenders 50 from all the connection points to the frame 12. The electrical connections 65, found just forward of and leading to the brake lights 64, must also be disconnected in order to remove the panel assembly 300 from the vehicle 10. It is contemplated that in some implementations the fenders 50 could be provided with reflectors such that no disconnection of electrical contacts would be needed.

Similarly, the four fasteners 227 connecting the cargo platform 58 to the cross-member 225 are removed in order to disconnect the panel assembly 300 from the vehicle 10 at step 410. It is contemplated that there may be more or less fasteners connecting the cargo platform 58 to the frame 12 and the method 400 would be adapted to disconnect the cargo platform 58 from all the connection points to the frame 12. For the panel assembly 300, the disconnecting at step 410 the panel assembly 300 includes disconnecting the rear facia 62 from the cargo platform 58. For the panel assembly 300', disconnecting at step 410 the panel assembly 300' further includes disconnecting the rear facia 62 from the frame 12 at step 416. It should be noted that at no point in the method 400 are the fenders 50 or the rear facia 62 disconnected from the cargo platform 58.

Next, the method 400 continues with disconnecting at step 450 the portion of the frame 12 from a remainder of the frame 12. Specifically, the front end of the left leg 172 is disconnected from the left bracket 164 on the roll cage 106 of the frame 12 at step 452 and the front end of the right leg 172 is disconnected from the right bracket 164 on the roll cage 106 of the frame 12 at step 454. In disconnecting the legs 172, attention should be paid to prevent the panel assembly 300 from fall, as it is no longer supported on the vehicle 10. As the cross-member 181 is connected to the frame 12 via the left leg 172 and the right leg 172, there are no further steps necessary to disconnect the portion of the frame 12 from the remainder of the frame 12.

Finally, the method 400 concludes with withdrawing at step 470 the panel assembly 300 and the portion of the frame 12 as a unit away from the vehicle 10 in order to expose the engine 30 and allow the user to access the engine 30 and the surrounding components. It should be noted that the method 400 has not required the panel and frame components to be separated from each other, and the panel assemblies 300, 300' and the corresponding portions of the frame 12 require little work to provide the user access to the engine 30.

It is contemplated that the method 400 could include additional or different steps, either to perform additional functions and/or to perform the steps described above. Additionally, the steps 410, 412, 414, 416, 450, 452, and 454 could be performed in an assortment of different sequences, depending on for example user preferences, and is not limited to the order set forth in the explanation above.

The vehicle 10 and method 400 implemented in accordance with some non-limiting implementations of the present technology can be represented as presented in the following numbered clauses.

CLAUSE 1: A vehicle (10) comprising: a frame (12); a driver seat (24) connected to the frame (12); a plurality of ground engaging members (14, 18) operatively connected to the frame (12); a motor (30) operatively connected to at least one of the ground engaging members (14, 18), the motor (30) being disposed rearward of the driver seat (24); and a panel assembly (300, 300') connected to the frame (12), the motor (30) being accessible to a user when the panel assembly (300, 300') is removed, the panel assembly (300, 300') including at least: a cargo platform (58), a left side panel (50) connected to a left side of the cargo platform (58), and a right side panel (50) connected to a right side of the cargo platform (58), the panel assembly (300, 300') and a portion of the frame (12) being selectively removable from the vehicle (10) as a unit.

CLAUSE 2: The vehicle (10) of clause 1, wherein the portion of the frame (12) comprises: a cross-member (181) disposed under the cargo platform (58); a left leg (172), a first end of the left leg (172) being connected to a roll cage (106) of the vehicle (10), a second end of the left leg (172) being connected to a left end of the cross-member (181), the left leg (172) passing through the left side panel (50); and a right leg (172), a first end of the right leg (172) being connected to the roll cage (106) of the vehicle (10), a second end of the right leg (172) being connected to a right end of the cross-member (181), the right leg (172) passing through the right side panel (50).

CLAUSE 3: The vehicle (10) of clause 2, wherein: the left leg (172) extends upward and forward from the second end of the left leg (172) to the first end of the left leg (172); and the right leg (172) extends upward and forward from the second end of the right leg (172) to the first end of the right leg (172).

CLAUSE 4. The vehicle (10) of clause 1, wherein the panel assembly (300, 300') further comprises a rear facia panel (62) connected to the cargo platform (58).

CLAUSE 5: The vehicle (10) of clause 4, wherein the rear facia panel (62) extends below the cargo platform (58) and is disposed rearward of the motor (30).

CLAUSE 6: The vehicle (10) of clause 4, wherein: at least two ground engaging members (18) of the plurality of ground engaging members (14, 18) are a rear left wheel (18) and a rear right wheel (18); a top portion of the rear left wheel (18) is disposed longitudinally between a portion of the left side panel (50) (50) and a left end of the rear facia panel (62); and a top portion of the rear right wheel (18) is disposed longitudinally between a portion of the right side panel (50) and a right end of the rear facia panel (62).

CLAUSE 7: The vehicle (10) of any one of clauses 1 to 6, wherein the left and right side panels (50) are generally L-shaped.

CLAUSE 8: The vehicle (10) of any one of clauses 1 to 7, wherein the left and right side panels (50) extend vertically higher than a top surface of the cargo platform (58).

CLAUSE 9: The vehicle (10) of any one of clauses 1 to 8, wherein the cargo platform (58) is selectively separable from the left and right side panels (50).

CLAUSE 10: The vehicle (10) of any one of clauses 1 to 9, wherein, when the panel assembly (300, 300') is connected to the vehicle (10), the motor (30) is under the cargo platform (58) and laterally between the left and right side panels (50).

CLAUSE 11: The vehicle (10) of any one of clauses 1 to 10, further comprising: a right door (54) connected to the frame (12); and a left door (54) connected to the frame (12); and wherein: the right side panel (50) connects to the frame (12) near a hinge (55) of the right door (54); and the left side panel (50) connected to the frame (12) near a hinge (55) of the left door (54).

CLAUSE 12: The vehicle (10) of any one of clauses 1 to 11, wherein: the left side panel (50) is a first left side panel (50'); and the right side panel (50) is a first right side panel (50'); the vehicle (10) further comprising: a second left side panel (50") connected to a left side of the frame (12) and extending at least in part forward of the first left side panel (50'); a first left fastener connecting a forward end of the first left side panel (50') to the frame (12); a second left fastener connecting the first left side panel (50') to the second left side panel (50"); a second right side panel (50") connected to a right side of the frame (12) and extending at least in part forward of the first right side panel (50'); a first right fastener connecting a forward end of the first right side panel (50') to the frame (12); and a second right fastener connecting the first right side panel (50') to the second right side panel (50").

CLAUSE 13: The vehicle (10) of any one of clauses 1 to 12, wherein the frame (12) comprises: a front frame portion (102); a central frame portion (100) connected to the front frame portion (102) and being disposed rearward of the front frame portion (102); and a rear frame portion (104) connected to the central frame portion (100) and being disposed rearward of the central frame portion (100); and wherein: the motor (30) is mounted to the rear frame portion (104); and the panel assembly (300, 300') partially surrounds the rear frame portion (104) when the panel assembly (300, 300') is connected to the vehicle (10).

CLAUSE 14: A method of accessing a motor (30) of a vehicle (10) having a frame (12), the method comprising: disconnecting a panel assembly (300, 300') from the vehicle (10), the panel assembly (300, 300') including: a cargo platform (58), a left side panel (50) connected to a left side of the cargo platform (58), and a right side panel (50) connected to a right side of the cargo platform (58), the panel assembly (300, 300') selectively covering the motor (30), the motor (30) being disposed rearward of a driver seat (24) of the vehicle (10), the panel assembly (300, 300') being removable without separation of the left and right side panels (50) from the cargo platform (58); disconnecting a portion of the frame (12) from a remainder of the frame (12); and withdrawing the panel assembly (300, 300') and the portion of the frame (12) as a unit away from the vehicle (10) for exposing the motor (30).

CLAUSE 15: The method of clause 14, wherein disconnecting the panel assembly (300, 300') from the vehicle (10) includes: removing at least a first fastener connecting the left side panel (50) to the frame (12); and removing at least a second fastener connecting the right side panel (50) to the frame (12).

CLAUSE 16: The method of clause 14, wherein: the portion of the frame (12) comprises: a cross-member (181) disposed under the cargo platform (58), a left leg (172) connected to a left end of the cross-member (181), the left leg (172) passing through the left side panel (50), and a right leg (172) connected to a right end of the cross-member (181), the right leg (172) passing through the right side panel (50), and the disconnecting the portion of the frame (12) from the remainder of the frame (12) comprises: disconnecting an end of the left leg (172) from a remainder of the frame (12), and disconnecting an end of the right leg (172) from the remainder of the frame (12).

CLAUSE 17: The method of clause 16, wherein: the disconnecting the end of the left leg (172) from the remainder of the frame (12) comprises disconnecting the end of the left leg (172) from a roll cage (106) of the frame (12); and the disconnecting the end of the right leg (172) from the remainder of the frame (12) comprises disconnecting the end of the right leg (172) from the roll cage (106) of the frame (12).

CLAUSE 18: The method of clause 14, wherein: the panel assembly (300, 300') further comprises a rear facia panel (62) connected to the cargo platform (58); and the disconnecting the panel assembly (300, 300') from the vehicle (10) includes disconnecting the rear facia panel (62) from the frame (12).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a driver seat connected to the frame;
a plurality of ground engaging members operatively connected to the frame;
a motor operatively connected to at least one of the ground engaging members, the motor being disposed rearward of the driver seat; and
a panel assembly connected to the frame, the motor being accessible to a user when the panel assembly is removed, the panel assembly including at least:
a cargo platform,
a left side panel connected to a left side of the cargo platform, and
a right side panel connected to a right side of the cargo platform,
the panel assembly and a portion of the frame being selectively removable from the vehicle as a unit, the portion of the frame including:
a cross-member disposed under the cargo platform,
a left leg, a first end of the left leg being connected to a roll cage of the vehicle, a second end of the left leg being connected to a left end of the cross-member, the left leg passing through the left side panel, and
a right leg, a first end of the right leg being connected to the roll cage of the vehicle, a second end of the right leg being connected to a right end of the cross-member, the right leg passing through the right side panel,
the motor being under the cargo platform and laterally between the left and right side panels when the panel assembly is connected to the vehicle.

2. The vehicle of claim 1, wherein:
the left leg extends upward and forward from the second end of the left leg to the first end of the left leg; and
the right leg extends upward and forward from the second end of the right leg to the first end of the right leg.

3. The vehicle of claim 1, wherein the panel assembly further comprises a rear facia panel connected to the cargo platform.

4. The vehicle of claim 3, wherein the rear facia panel extends below the cargo platform and is disposed rearward of the motor.

5. The vehicle of claim 3, wherein:
at least two ground engaging members of the plurality of ground engaging members are a rear left wheel and a rear right wheel;
a top portion of the rear left wheel is disposed longitudinally between a portion of the left side panel and a left end of the rear facia panel; and
a top portion of the rear right wheel is disposed longitudinally between a portion of the right side panel and a right end of the rear facia panel.

6. The vehicle of claim 1, wherein the left and right side panels are generally L-shaped.

7. The vehicle of claim 1, wherein the left and right side panels extend vertically higher than a top surface of the cargo platform.

8. The vehicle of claim 1, wherein the cargo platform is selectively separable from the left and right side panels.

9. The vehicle of claim 1, wherein:
the left side panel is a first left side panel; and the right side panel is a first right side panel;
the vehicle further comprising:
a second left side panel connected to a left side of the frame and extending at least in part forward of the first left side panel;
a first left fastener connecting a forward end of the first left side panel to the frame;
a second left fastener connecting the first left side panel to the second left side panel;
a second right side panel connected to a right side of the frame and extending at least in part forward of the first right side panel;
a first right fastener connecting a forward end of the first right side panel to the frame; and
a second right fastener connecting the first right side panel to the second right side panel.

10. A method of accessing a motor of a vehicle having a frame, the method comprising:
disconnecting a panel assembly from the vehicle, the panel assembly including:
a cargo platform,
a rear facia panel connected to the cargo platform,
a left side panel connected to a left side of the cargo platform, and
a right side panel connected to a right side of the cargo platform,
the panel assembly selectively covering the motor, the motor being disposed rearward of a driver seat of the vehicle, the panel assembly being removable without separation of the left and right side panels from the cargo platform,
disconnecting the panel assembly from the vehicle including:
disconnecting the rear facia from the frame,
removing at least a first fastener connecting the left side panel to the frame, and
removing at least a second fastener connecting the right side panel to the frame;
disconnecting a portion of the frame from a remainder of the frame; and
withdrawing the panel assembly and the portion of the frame as a unit away from the vehicle for exposing the motor.

11. The method of claim 10, wherein:
the portion of the frame comprises:
a cross-member disposed under the cargo platform,
a left leg connected to a left end of the cross-member, the left leg passing through the left side panel, and
a right leg connected to a right end of the cross-member, the right leg passing through the right side panel, and
the disconnecting the portion of the frame from the remainder of the frame comprises:
disconnecting an end of the left leg from a remainder of the frame, and
disconnecting an end of the right leg from the remainder of the frame.

12. The method of claim 11, wherein:
the disconnecting the end of the left leg from the remainder of the frame comprises disconnecting the end of the left leg from a roll cage of the frame; and
the disconnecting the end of the right leg from the remainder of the frame comprises disconnecting the end of the right leg from the roll cage of the frame.

* * * * *